United States Patent [19]

Ryder

[11] 4,364,720

[45] Dec. 21, 1982

[54] MOLDING MACHINE AND SYSTEM FOR ACCOMODATING A PLURALITY OF SUCH MACHINES

[75] Inventor: Francis E. Ryder, Arab, Ala.

[73] Assignee: Ryder International Corporation, Arab, Ala.

[21] Appl. No.: 218,628

[22] Filed: Dec. 22, 1980

[51] Int. Cl.³ .............................................. B29F 1/06
[52] U.S. Cl. .................. 425/144; 425/451.2; 425/451.9; 425/590; 425/595
[58] Field of Search .................. 425/144, 451.9, 595, 425/810, 451.2, 590

[56] References Cited

U.S. PATENT DOCUMENTS

| | | | |
|---|---|---|---|
| 3,737,268 | 6/1973 | Ryder | 425/192 |
| 3,918,875 | 11/1975 | Philipson | 425/810 X |
| 3,969,057 | 7/1976 | Pierre | 425/810 X |
| 4,059,383 | 11/1977 | Tsutsumi | 425/451.9 X |
| 4,235,576 | 11/1980 | Robinson | 425/590 X |

Primary Examiner—Thomas P. Pavelko
Attorney, Agent, or Firm—Trexler, Bushnell & Wolters

[57] ABSTRACT

There is disclosed an improved molding machine and a system for utilizing said machine, wherein central sources of supply are used to provide the operating requirements for the machine, such as high pressure hydraulic fluid, compressed air, cooling water and electic power. The machine disclosed utilizes a stationary platen and a movable platen, with a novel mold clamping arrangement as an integral part of the movable platen assembly. In this regard, said movable platen includes a pair of relatively movable plate members, with a high pressure diaphragm interposed therebetween. On the rearward most plate member there is mounted latching means for fixing the position of said rearward plate member preparatory to pressurizing of the diaphragm. When pressurized, the diaphragm will force the forward most plate member toward the stationary platen to effect the desired preloading of the mold inserts carried by said platens.

9 Claims, 8 Drawing Figures

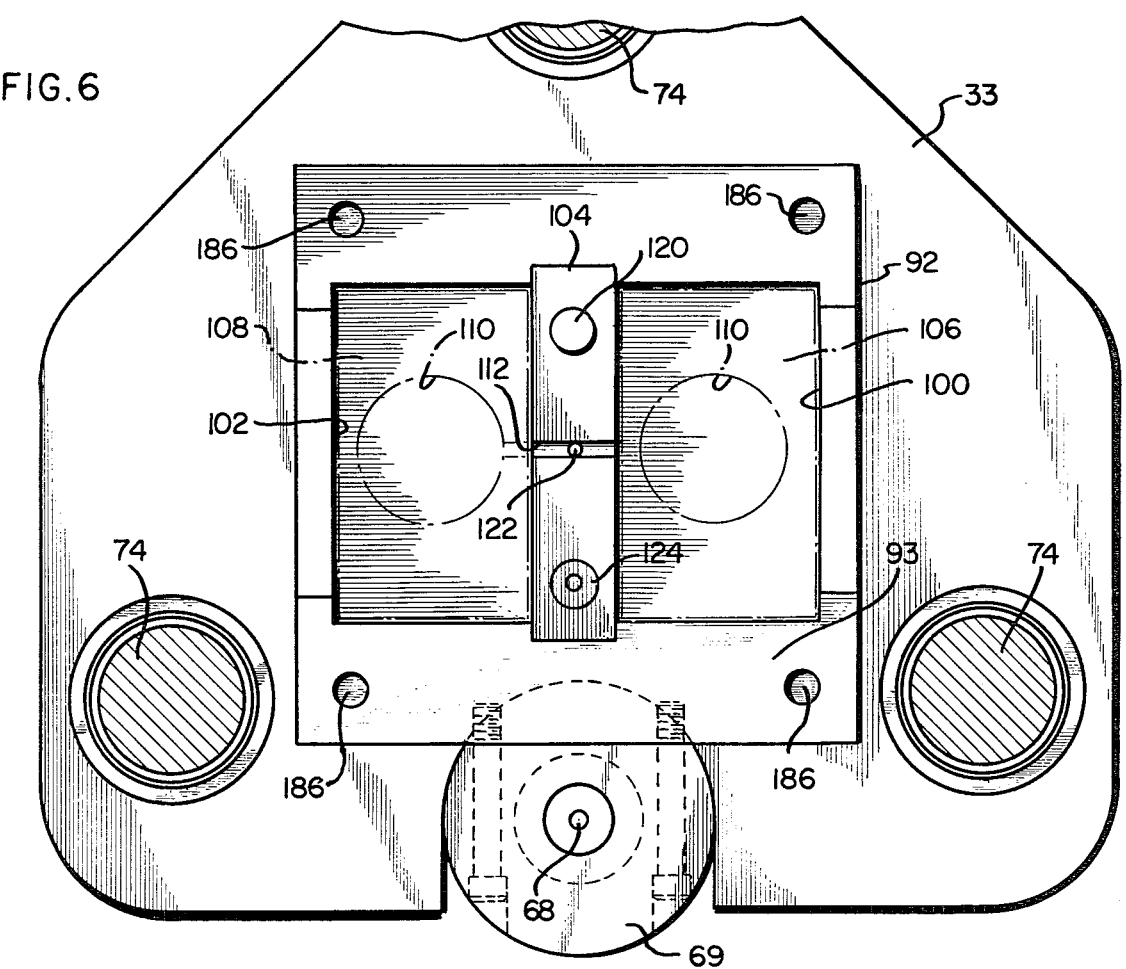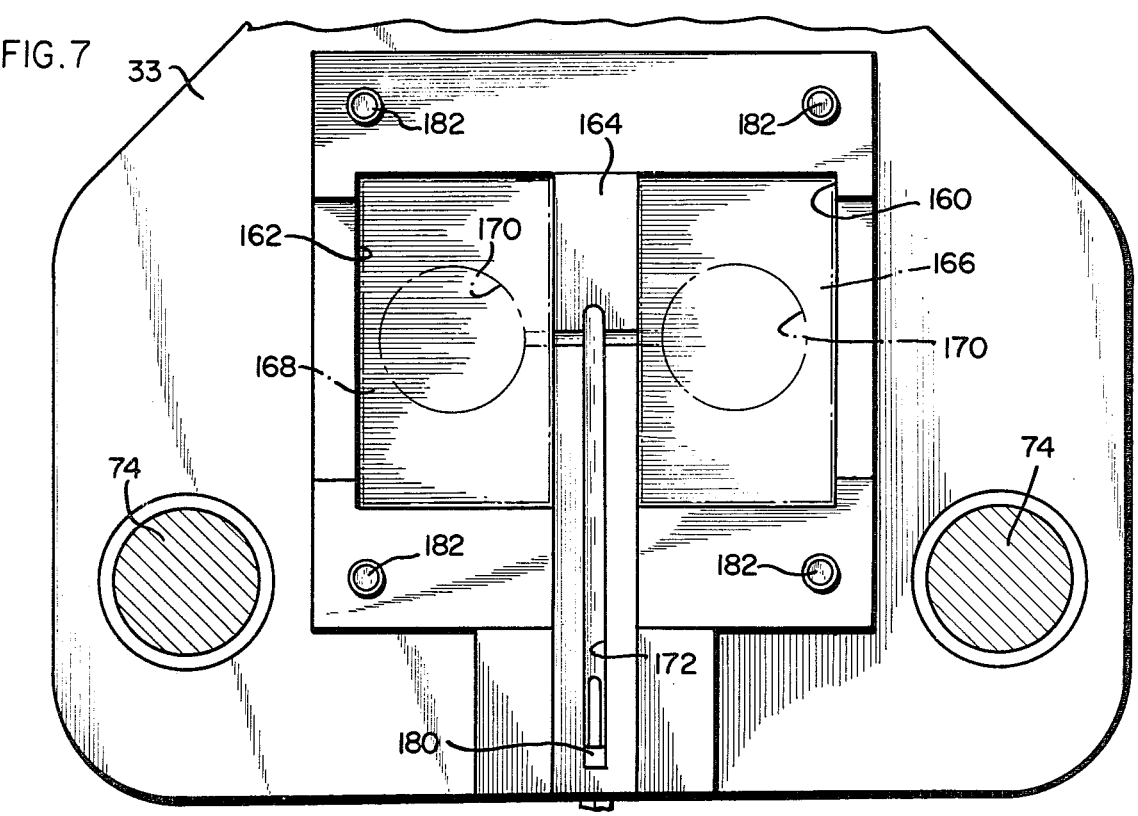

MOLDING MACHINE AND SYSTEM FOR ACCOMODATING A PLURALITY OF SUCH MACHINES

BACKGROUND OF THE INVENTION

The present invention relates to injection molding apparatus, and more specifically to an improved machine design and system for the efficient performance of the injection molding process.

Injection molding machines are well known, and generally include two major sub-assemblies or systems; namely, the injection system for handling, heating and injection of the liquid thermoplastic resin into the mold cavity under extremely high pressure, and the system for handling the mold components. The latter system normally includes an arrangement for pre-loading the mold components in clamped relation and some form of ejector means for removing the molded parts from the mold cavity. As can be appreciated the larger and more complex the parts to be molded, the greater the injection and clamping pressure required to achieve properly molded parts. Thus, one purchasing an injection molding machine normally will have to purchase a unit of sufficient size and capacity to handle the maximum molding job envisioned. As such, most molding machines are "over-sized" with respect to a vast majority of their every day uses. Also, these prior art types of machines are of the self-contained integrated variety, in that each machine includes its own hydraulic fluid pressurizing system, and in many instances its own air compressing system. As a result of the necessity of purchasing "over-sized" machines, considerable cost is expended in obtaining machine capacity which is unnecessary, and is rarely used. However, the presence of integrated self-contained systems, requires operation during every day use, resulting in a waste of energy and serving to increase manufacturing cost.

The present invention is directed primarily at an individual machine design which was developed for incorporation in an overall system utilizing a number of machines and central sources of supply for the operating requirements such as cooling water, compressed air and high pressure hydraulic fluid, so as to eliminate redundant, integrated systems as a result thereof. The present invention minimizes the cost of machine operation as well as the initial cost of the machine.

Concerning the basic overall system there is provided a plurality of machines each of which has been designed and fabricated without the employment of an integrated, individual system for high pressure hydraulic fluid or compressed air although the machines are designed to operate utilizing compressed air and pressurized hydraulic fluid. As a further matter these machines will require additional operation requirements, such as cooling water and electrical power. In this regard, a single, centrally located source for each operating necessity is provided at a first, relatively remote location. This location is accoustically and environmentally isolated from the area where the individual machines are located, with the operating mecessities or requirements, viz., compressed air, high pressure hydraulic fluid, cooling water, and electric power, being supplied to the machines by service lines and a manifold system which controls and allocates a particular operating component to a selected machine based upon its requirements, as determined by the job being performed. As such, the machines can be operated at varying levels or capacities, without overloading the system, and also without wasting the particular operating component involved, be it cooling water, compressed air, power or high pressure hydraulic fluid.

Further, the overall machine of the design of the present invention is adapted for improved operation. In this regard, a "unit mold" concept is utilized, similar to that as disclosed in the Inventor's prior U.S. Pat. No. 3,737,268. The unit mold concept is employed in conjunction with a novel clamping mechanism for attaining the pre-loading of the abutting mold components while utilizing an extremely short stroke for the moveable mold platen, which results in the provision of shorter tie-rods. This is accomplished without compromising the overall rating of the machine as to the mold injection pressure that can be employed. In this regard, it should be kept in mind that most prior art machines utilize a toggle type of arrangement for producing the initial loading of the mold components, and as such of necessity employ relatively long tie-rods and a lengthy stroke in moving the mold component rearward from the molding position to the unloading or ejecting position.

Accordingly, it is an object of the present invention to provide a new and novel system for accommodating a plurality of injection molding machines wherein said machines are supplied with required operating components from a centralized source, the source for said operating components being acoustically and environmentally isolated from the area of machine operation.

A further object of the invention is to provide an improved machine design for use in a system of the type described above.

In accordance with the above objects, there is provided a machine which utilizes the basic sub-assemblies of a standard molding machine, namely, heating and injecting means for the thermoplastic material, and a mold handling system for moving the mold components between a mold closed position and a mold open position. The mold handling system of this machine is improved to provide novel clamping and locking means which enable the desired clamping pressures to be attained without excessive mold travel and in a more uniform and reliable fashion. More specifically, the design employs a pair of mold platens, each of which is recessed to receive a mold insert or component having a portion of the mold cavity formed therein. The mold platens are integral parts of the machine, with one being larger than the other, the larger of the two platens containing the ejection mechanism and being fixedly mounted with respect to the machine base and the tie-rods extending longitudinally of the machine base. The other platen is of lesser size and is slidably mounted on the tie-rods for movement into abutting relation with the stationary platen to define the mold closed position, and away from said stationary platen to define the mold open position. The initial travel or movement of the second platen is effected with a high-speed, low-pressure system which can rapidly traverse the movable platen to and from the desired operating positions. The moveable platen includes novel means for locking the mold halves in relative abutting position and for pre-loading the platens and the mold inserts prior to the high pressure injection of the heated thermplastic resin material. To achieve pre-loading, the moveable platen member includes two separate relatively moveable plate members with a high-pressure diaphragm interposed therebetween. The rearward plate member is adapted to be locked in position with respect to the machine tie-rods, and the diaphragm then pressurized to force the adjacent, forward plate member towards the stationary mold platen under high-pressure to achieve the desired pre-loading. The design is extremely advantageous, as the force from the high pressure diaphragm is applied equally over a relatively large area and permits achievement of the necessary pre-loading rapidly and without the localized application of force, as is attendant with the prior art type of toggle pre-loading systems.

The above discussed specific objects and other objects will become apparent from the detailed description of the invention which follows, said description being setforth in conjunction with the accompanying drawings.

BRIEF DESCRIPTION OF THE DRAWINGS

FIGS. 6 and 7 are front views of the stationary mold platen and the moveable mold platen, respectively;

FIG. 8 is a partial sectional view taken generally along the line 8—8 of FIG. 3 and illustrating the latch mechanisms for the moveable mold platen.

DETAILED DESCRIPTION OF THE ILLUSTRATED EMBODIMENT

Figure 1:
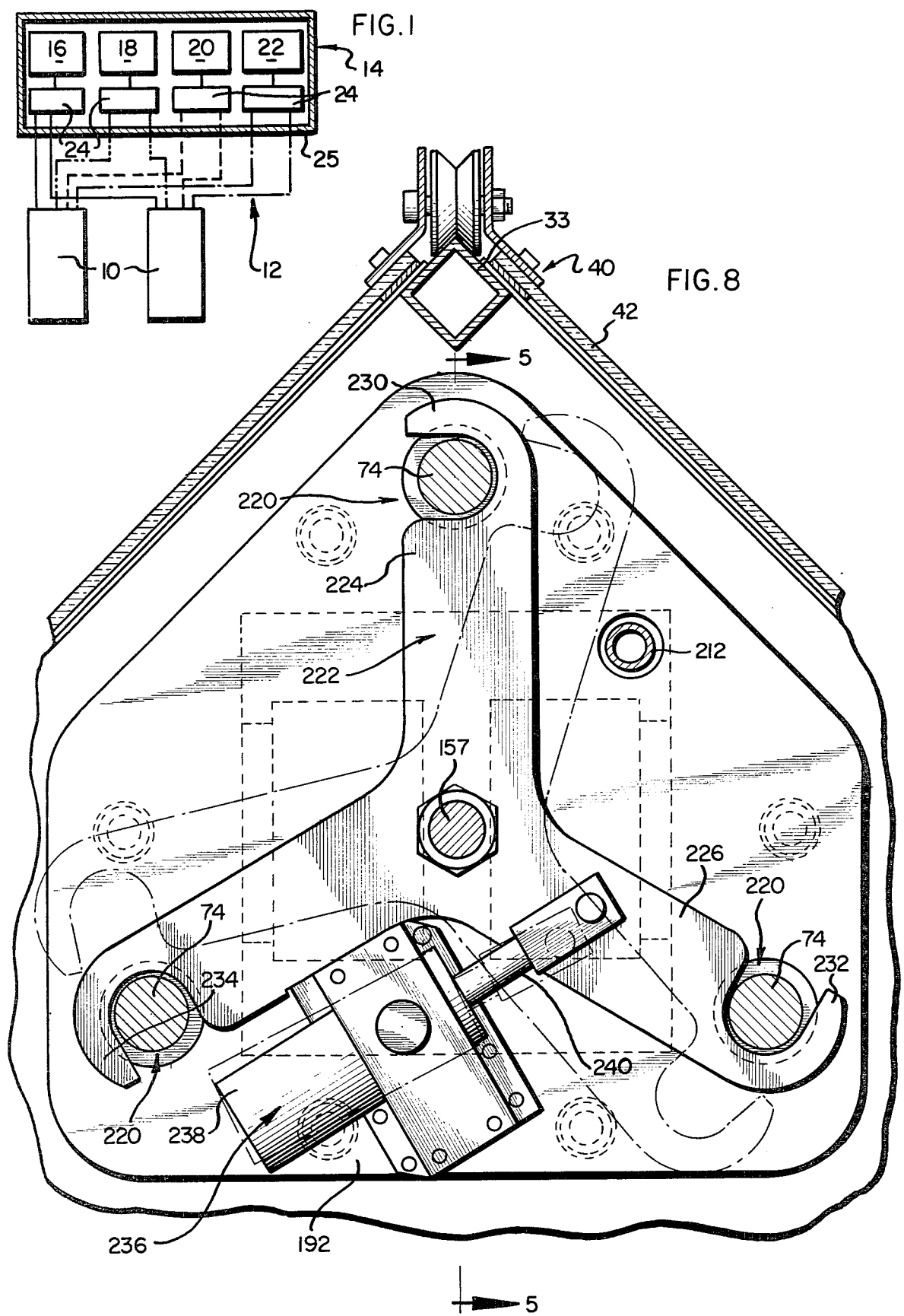
FIG. 1 is a partial, schematic representation of a system layout for a number of injection molding machines, in accordance with the present invention.

Referring now to the drawings, FIG. 1 illustrates schematically a system of the present invention utilizing preferably the novel molding machine design to be discussed in greater detail with regard to FIGS. 2–8. With regard to FIG. 1, a number of machines 10, two being illustrated, are located in a first area 12 of a plant or building. Each machine 10 is of a type which requires certain operating means or necessities such as compressed air, pressurized hydraulic fluid, cooling water, and electric power for operation thereof. The machines 10, however, are constructed without employment of the integrated, self-contained systems for providing the operating means. That is to say, the machines 10 while relying upon the above named operating means for effective operation thereof, do not employ high pressure hydraulic pumps, cooling water pumps, air compressors, or the like. Adjacent to the area 12 there is provided an area 14, wherein there is provided the necessary sources for the operating means mentioned above and required by the machines 10. In this regard, within the area 14 there is housed an air compressor system 16; a system 18 for providing high pressure hydraulic fluid, including pumps for delivery thereof to the machine 10; a cooling water recirculating system 20; and a source of electric power 22. These sources of the above operating necessities are connected to each machine 10 via a series of supply lines, with the supply of each operating means, being controlled by use of known types of manifolds or control apparatus, indicated generally at 24. The area 12 wherein the machines 10 are operated, is acoustically and environmentally isolated from the area 14 of the systems 16,18, 20 and 22 by a barrier wall 25.

The respective manifold or control means 24 may be of various known types, and the purpose thereof is to allocate or direct the particular operating means, be it compressed air, high pressure hydraulic fluid or the like to a machine 10 at the proper time and at the proper pressure level or in the desired quantity. In this regard, the requirements of the various machines can be determined depending upon the particular molding job being performed, and only the amount or quantity of operating means required is then supplied to the particular machine. As such, power is not wasted unnecessarily, and the requirements of the various machines can be programmed with respect to the capacity of the source systems 16, 18,20 and 22, to be sure that under supply conditions do not result. Further, since the individual machines 10 do not include individual, integrated sources for supply of the various operating means, their overall manufacturing cost is less and this advantage is achieved without sacrificing machine performance.

Figure 2:
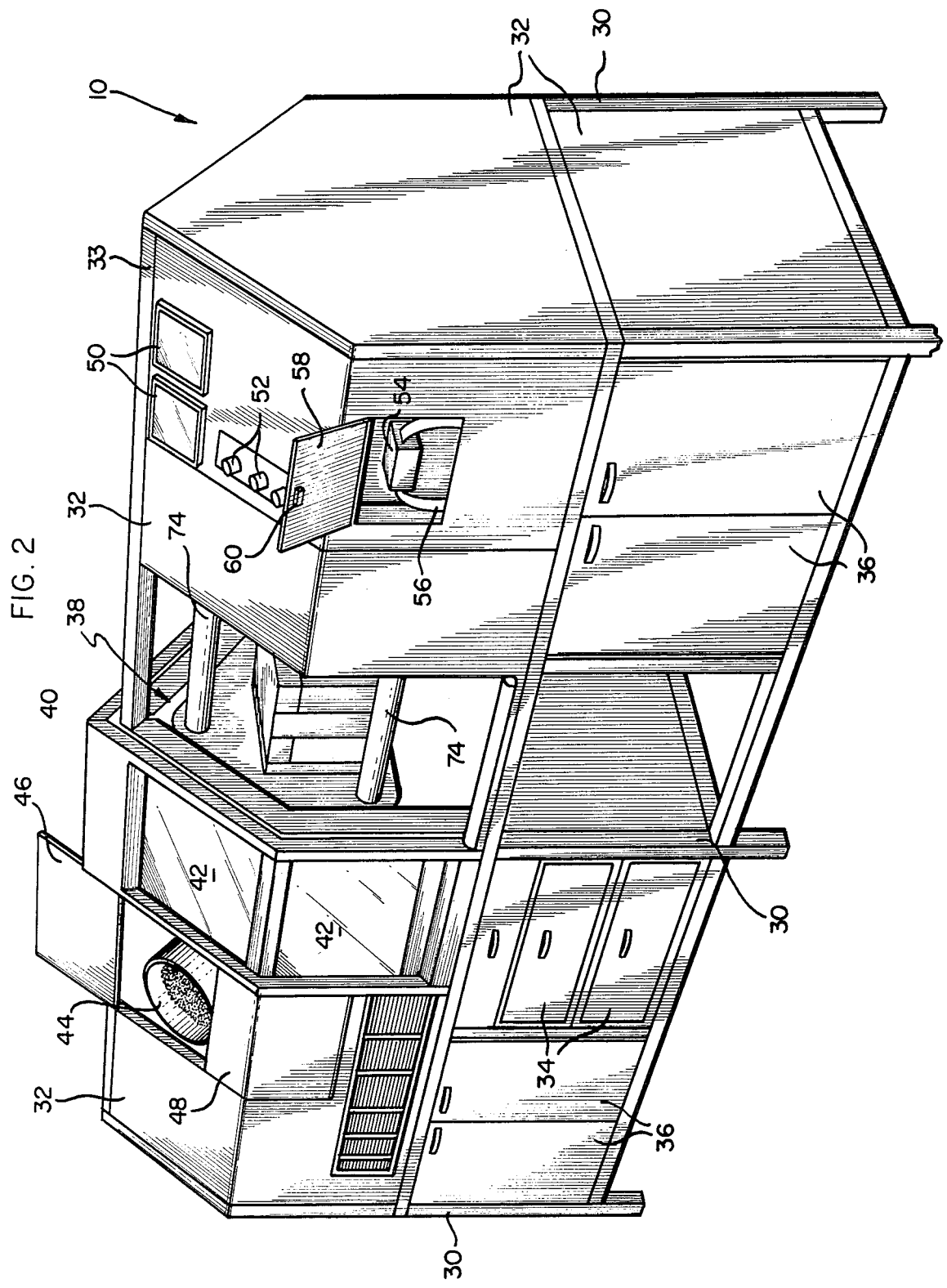
FIG. 2 is a perspective view of an injection molding machine in accordance with a further aspect of the present invention, with the machine safety shield open to expose to view the mold area.
Figure 3:
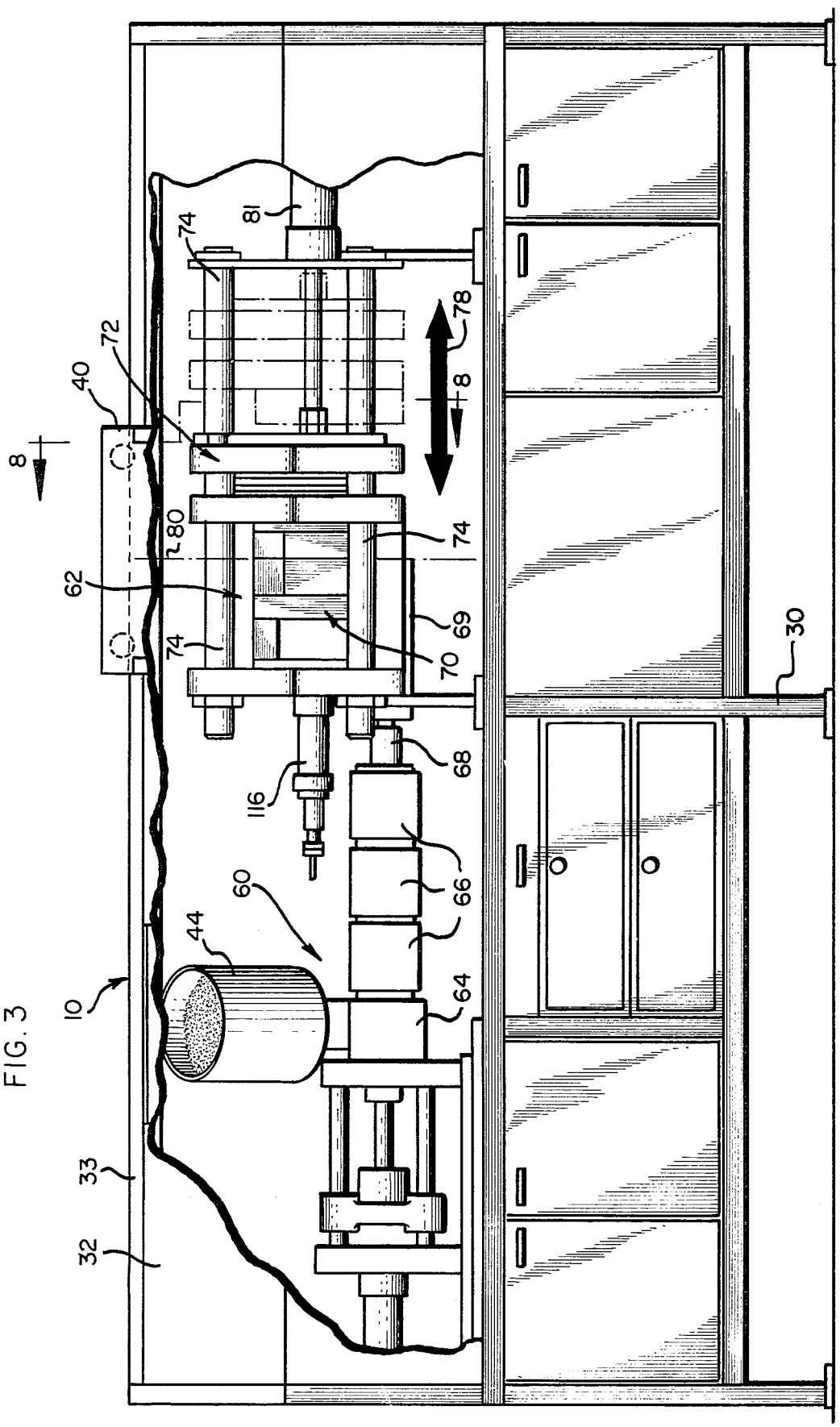
FIG. 3 is a front elevational view of the machine of FIG. 2, with the upper portion of the outer skin of the machine broken away to illustrate the internal components of said machine.

With regard to FIGS. 2–8, a preferred construction for a molding machine 10 of the type to be employed with the systems of FIG. 1 is shown. In FIGS. 2 and 3, the machine 10 is shown generally, with regard to its outer housing or casing design, and its basic component systems. The machines novel clamping mean for the mold components is illustrated and will be discussed with regard to FIGS. 4–8.

Looking first to FIG. 2 the machine 10 includes a frame 30 which provides a support for the basic components or systems of the machine as will be detailed more fully hereinafter. In addition, the frame 30 also provides support means for a series of panels which provide the outer skin or machine housing 32, with the upper portion of the housing 32 being peaked and terminating in a main or apex frame member 33. The lower portion of the housing 32 includes a number of drawers 34 and cabinets 36 which can be utilized for tool storage, as well as the storage of spare components, molds or the like. Centrally of the machine 10, there is provided an open area designed generally 38, wherein the mold components and the mold handling system are housed. Slidably supporting on the apex frame 33 is a safety door or shield 40, which includes transparent panels 42 permitting viewing of the molding operation. As shown, the sliding safety door 40 is in the open position thereby providing access to the interior of the housing 32 in the area 38 of the mold components. To the left of the opening 38, as viewed, is a supply hopper 44 which provides granular thermoplastic resin material to the heating and injection system of the machine. A set of door panels 46 and 48 are provided, which are integral parts of the housing skin 32, and when closed will overlie the hopper 44 thereby maintaining the outer peak contour of the housing.

To the right of the opening 38, there is illustrated certain control means 50 and 52 employed in the operation of the machine, such as for example, maintaining and controlling the temperature of the thermoplastic resin, the injection pressure, the clamping pressure; the cooling cycle, etc. It is envisioned, that the machine 10 will be adapted to automatic operation, and in this regard there is provided a tape reader 54 which is operatively connected to the internal control mechanism of the machine. For any given molding job, an engineer will determine the desired parameters of operation such as noted above and will encode this information on tape 56. The tape 56 is played through the tape reader 54 with the reader 54 providing the necessary control signals to initiate operation of the various systems of the machine at a desired stage or point in a cycle of operation. The tape reader 54 is of a known construction and design, and is preferably located interiorly of the machines skin or housing 32, and is covered by a door panel 58 which includes a lock 60, such that when the tape reader 54 is engaged and the door 58 is locked, the machine 10 will operate automatically and an over zealous operator cannot override the tape reader operation and control of the machine by use of the manual controls 52.

FIG. 3 is a front view of the machine 10, with a portion of skin 32 broken away to illustrate the internal subsystems which cooperate in the molding operation. Basically, the machines include a first system or arrangement designated generally 60 for heating and injection of the thermoplastic material; and a second system or arrangement 62 for handling the mold components. Looking first to the heating and injection system 60, this system includes the hopper 44 for the thermoplastic resin with said hopper 44 delivering resin pellets to a combination heater-injector 64. The heater-injector 64 has a series of heating bands 66 about the periphery thereof which will maintain the resin at sufficiently elevated temperature to ensure its liquid state, preparatory to injection into the mold components. The heater-injector, is of known construction, and normally employs an auger or some other type of internal pressure developing arrangement for delivering the heated thermoplastic material under high pressure to a nozzle portion 68. The nozzle portion 68 is in operative communication with the mold components of the system 62 and will effect the desired injection of the plastic material into the mold cavity in a manner which will become apparent from the discussion which follows with regard to FIGS. 4 and 5.

As to the mold component handling system 62, said system basically includes a stationary platen assembly 70 and a movable platen assembly 72. Both the platen assemblies 70 and 72 are mounted with respect to a series of tie-rods 74, with the movable platen assembly 72 being slidable laterally along the length of the tie-rods, as indicated by the arrow 78. The respective platen assemblies 70 and 72 are provided with recesses into which mold components may be mounted, the components having mating cavities which will define the shape of the products to be formed. For a more detailed discussion and disclosure of this concept, reference should be had to U.S. Pat. No. 3,737,268, the disclosure of which is incorporated herein by reference.

With regard to FIG. 3, the respective platen assemblies 70 and 72 are illustrated in full line in the mold closed position wherein said assemblies and the mold components carried thereby will abut along a parting line 80. The moveable platen 72 is retractable from the mold closed position as illustrated in full line, to a mold open position, as illustrated in dotted outline in FIG. 3.

To effect rapid traverse of the platen assembly 72 in this regard an air cylinder 82 is provided. The operation of which will be discussed in greater detail in conjunction with FIGS. 4 and 5.

Figure 4:
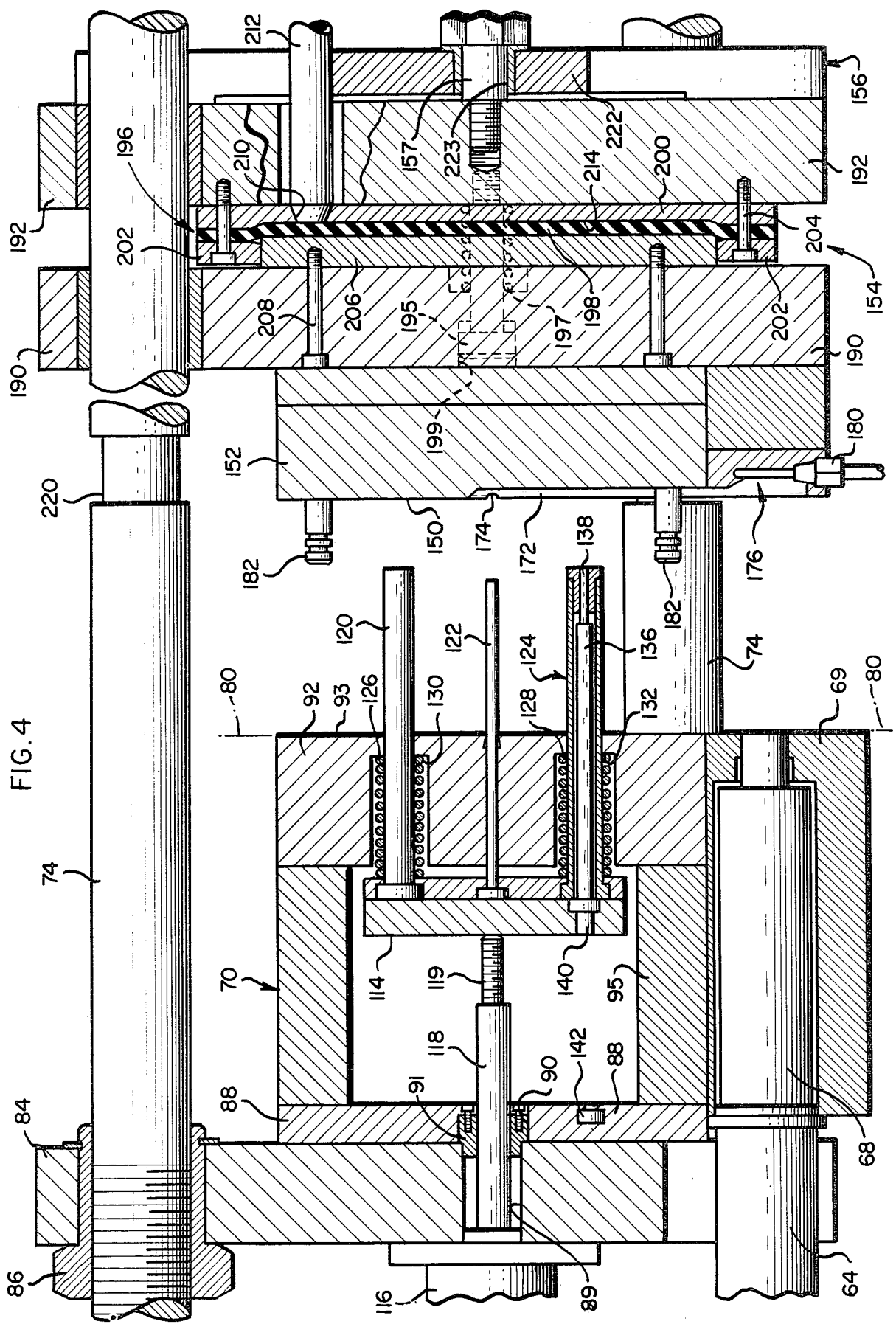
FIG. 4 is an enlarged, partial sectional view through the mold platens which are in the mold open or eject position, and with the mold clamping means de-energized.
Figure 5:
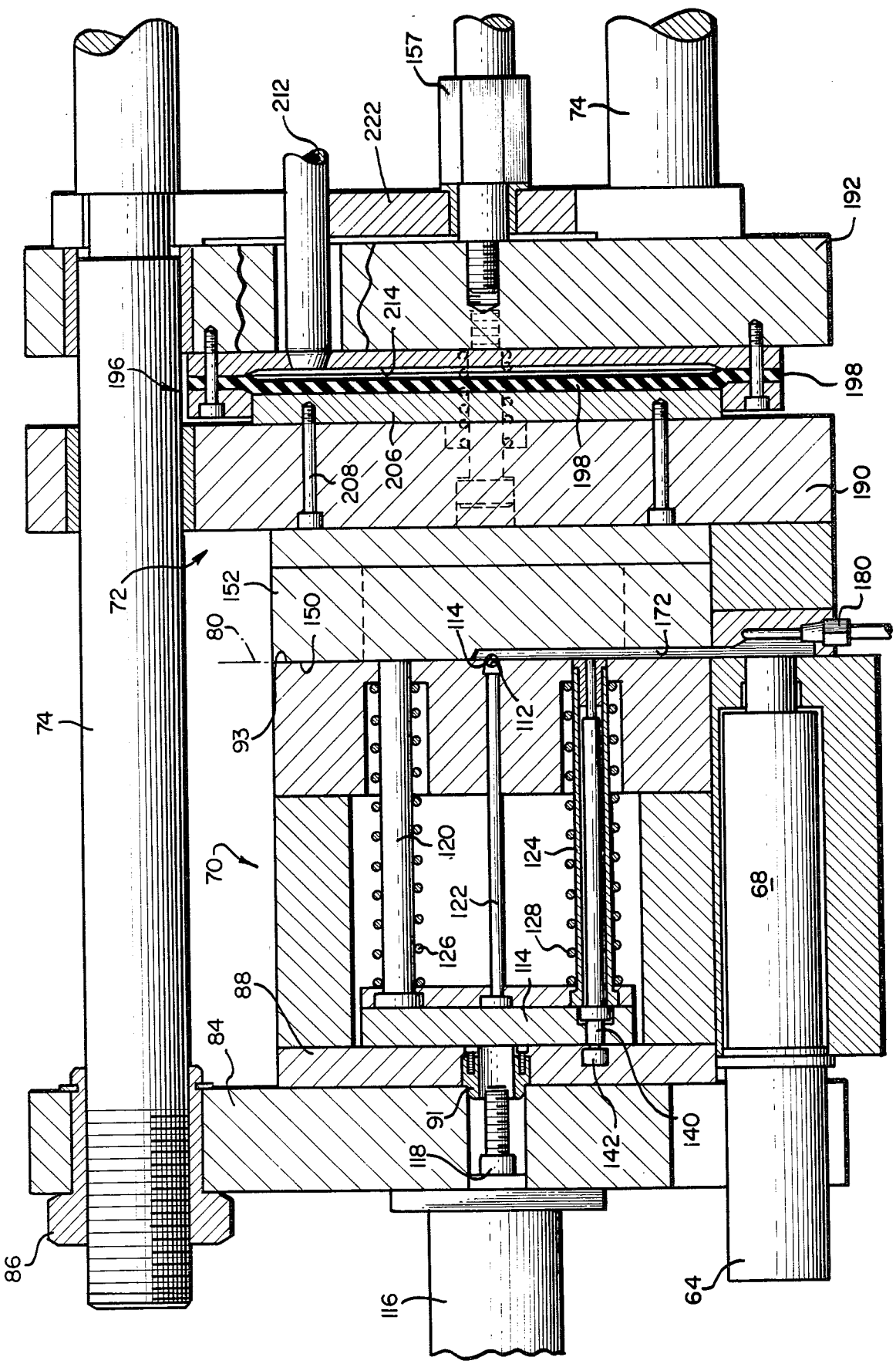
FIG. 5 is a partial sectional view similar to FIG. 4, but with the mold platens in the mold closed position, and with the novel mold clamping means of the present invention energized.

Attention is now invited to FIGS. 4 and 5 wherein the mold component handling system 62 and the construction of the stationary and movable platen assemblies 70 and 72 are shown in greater detail. Looking first to FIG. 4, the platen assemblies 70 and 72 are shown in the mold open position with a part ejector system 82, which is an integral component of the stationary platen 70, being shown in its extended position, as would occur upon removal of a molded part from the platen assemblies.

The stationary platen assembly 70 is illustrated in the left-hand portion of FIG. 4, as viewed, and is operatively connected to the barrel 68 of the heater-injector mechanism 64. The barrel 68 is received within a bushing 69 carried by the platen assembly 70, and serve to deliver the liquid thermoplastic material to the interface or parting line 80 between the mold platens 70 and 72 under extremely high pressure. The platen assembly 70 includes a base plate 84 which is secured to the threaded ends of the tie-rods 74 by nuts 86, said connection serving to fix the position of the stationary platen assembly 70 relative to said tie-rods. Mounted to the base plate 84, is a back plate 88 having a central aperture 90 communicating with an aperture 89 in the base plate 84, and having a bushing 91 mounted therein, which bushing provides support for the piston or operating arm of an air operated piston used to operate the ejector mechanism 82, as will be discussed more fully hereinafter. Said stationary platen 70 also includes a front plate assembly 92 spaced from the back plate 88 by upper and lower spacer plates 95, with the back plate 88, spacer plates 95 and the front plate assembly 92 serving to define an interior area or space designated generally 96. With reference to FIG. 6, which is a frontal view of the stationary platen 70, it can be seen that the front face 93 of the front plate assembly 92 includes a pair of openings or recesses 100 and 102 in the face thereof, which recesses are separated by a divider bar 104. The apertures or recesses 100 and 102 communicate with the interior space 96, and disposed in said recesses 100 and 102, are a pair of mold inserts 106 and 108, shown in dotted outline, each having a portion of a mold cavity 110 formed therein. The divider bar 104 includes a generally horizontal sprue segment 112 which connects with the cavities 110 and serve to deliver thermoplastic material to said cavities. The inserts 106 and 108 are approximately the thickness of the front plate 92, and may include integral ejector mechanisms or pins which are coupled to the ejector mechanism 82 carried within the space 96.

Looking now to the ejector mechanism 82, said mechanism includes primarily an ejector plate 114 carried within the interior space 96. An air cylinder or piston 116 is connected to the support plate 84 on the side opposite the space 96, with a piston or operating arm 118 of said cylinder extending through base plate 84 and back plate 88, and being supported by the bushing 91. The piston arm 118 includes an adjustable extension 119 attached to the end thereof and bearing against the plate 114. Affixed to the plate 114 are a series of pin-like or rod-like components 120, 122, and 124 which move with the plate, and will be discussed in greater detail hereinafter. It should be noted, however, that these components extend through the divider bar 104, viewed in FIG. 6. It should also be noted, that the mold inserts 106 and 108 may include integral ejector pins (not shown) which may be coupled to the ejector plate 114 for operation therewith, depending upon the complexity of the mold cavity, and the need for additional ejector pins. A more detailed showing of this type of arrangement which is known in the art, can be found in the Inventors prior U.S. Pat. No. 3,737,268, mentioned above, and incorporated in this disclosure by reference.

Concerning the pin-like components 120, 122, and 124 affixed to the ejector plate 114, it should be noted that in conjunction with the upper and lower components 120 and 124 there is provided a pair of compression springs 126 and 128, said springs being received within recesses 130 and 132, and tending to exert a force on the ejector plate in a direction opposite to that exerted by the air piston 116. As such, the springs 126 and 128 are used to assist in returning the ejector mechanism to its retracted position. In addition to the pin components 120 and 124, there is included a third pin 122 which communicated with the cross or horizontal sprue segment 112.

The pin components 122 and 124 serve as ejector pins to assist in removing the molded parts from the mold cavity 110 subsequent to cooling thereof, and in practice most likely will cooperate with additional ejector pins which are integral parts of the mold inserts 106 and 108. The lower most pin member 124 serves an additional feature, in that it provides for monitoring of the injection pressure of the thermoplastic material. More specifically the pin component 124 includes an inner shaft 136 which has a reduced diameter tip 138 extending to the end face of the pin component. In the mold closed condition for the platens 70 and 72, as shown in FIG. 5, the tip 138 is in direct communication with the main sprue channel in the opposite face of the movable platen assembly 72. The rear portion of the pin 136 is engaged against a pressure sensing device 140, which is in turn operably connected to one of the gauges 50 of the machine, and also to the internal control apparatus so as to provide a visual indication as to the injector pressure, and also to assist in automatically adjusting the injector pressure to maintain a desired pressure level.

The upper most pin 122 serves to assure return of the ejector mechanism 82 to its retracted position as the mold platens 70 and 72 move to the mold closed position. While the air cylinder 116 could be of the double acting type, if such an arrangement were employed there is a danger that should the piston 116 fail to retract the ejector mechanism 182, damage could result. With the present design, the air piston 116 is of the single acting type, and merely serves to bias the ejector mechanism 82 to the position as shown in FIG. 4. As the mold platens move to the closed position, the movable platen assembly 72 will move toward the position as shown in FIG. 5, with the end face 150 of said movable platen assembly engaging the pin component 120, serving to retract the ejector plate 114 and all pin members couple therewith to the left as viewed, to attain the final disposition thereof as shown in FIG. 5. In this regard, the springs 126 and 128 will assist in the retractive movement, and also serve to maintain the ejector plate in contact with the tip 119 of the air cylinder operating arm 118. As such, positive operation of air piston 116 is not essential upon closing of the mold platens as it is only necessary that the air piston unit be exhausted to atmosphere, or that some form of pressure relief valving be employed, that will accommodate retracting movement of the operating arm 118, as the return pin 122 is biased to the left by the movable platen assembly 72.

The construction of the movable platen 72 will now be considered initially with reference to FIG. 4, and also with reference to FIG. 7, which is a front view of said platen assembly. Basically, the movable platen assembly 72 is comprised of a forward plate element 152 having an end face 150; a clamping section 154 for developing the initial preloaded or clamping of the mold inserts preparatory to the injection operation; a latching arrangement, designated generally 156, and shown in greater detail in FIG. 8; and a rapid traverse mechanism in the form of the air cylinder 81 (FIG. 3), having an operating arm 157 shown in FIG. 4. The air cylinder or piston 81 is of the double acting type, and can effect rapid traverse of the movable platen 72 in the directions as indicated by the double headed arrow 78; that is, between the mold open position of FIG. 4 and the mold closed position of FIG. 5.

Looking now to the forward plate element 152 and FIG. 7, it can be seen that this plate element includes adjacent recesses 160 and 162 separated by a divider bar 164. The recesses 160 and 162, similar to those in the stationary platen 70, are adapted to accommodate mold inserts 166 and 168, as shown in dotted outline. Each mold inserts 166 or 168 includes a portion of a mold cavity 170, which upon movement of the platen assemblies 70 and 72 to the mold closed position, will cooperate with the mold cavities 110 and of inserts 106 and 108 to define fully enclosed mold cavities.

The divider bar 164 also includes a main vertical sprue channel 172 and a secondary cross sprue channel 174 the latter of which will cooperate with the horizontal or cross sprue channel 112 in the end face 93 of the opposed stationary platen 70. In the mold closed position, the end face 93 will overlie the vertical sprue channel 172, such that said channel and the resulting cross sprue channel 112-174 provide a path for the thermoplastic material to flow from the nozzle 68 to the mold cavities. As can be seen in FIG. 4, the lower portion of the vertical sprue channel 172 is enlarged at 176, which enlarged portion aligns with the injector nozzle 68 carried by the stationary platen 70 and provides for reception of the heated, pressurized thermoplastic resin. Preferably, a thermocouple device 180 is positioned in the enlarged sprue portion 176 to monitor temperature of the thermoplastic material being injected into the mold cavities. This monitoring can be used to provide a visual indication as to temperature of the thermoplastic material, as well as to assist in the control of the heating operation to ensure that said material is at the proper desired temperature upon entering the mold cavities.

The front plate element 152 also includes a series of leader pins 182 extending from the front surface 150 (see FIGS. 4 and 7). These leader pins 182 are adapted to be received within corresponding apertures 182 provided in the front plate 92 of the stationary platen 70, which apertures can be seen in FIG. 6. The disposition of the leader pins 182 into the apertures 184 will ensure proper positioning and alignment of the platens 70 and 72 upon movement to the mold closed position of FIG. 5.

In the mold closed position of FIG. 5, the ejector mechanism 82 is retracted and the facing ends surfaces 93 and 150 of the opposed front plates 92 and 152 are in abutting interfaced engagement along the parting line 80. This engagement serves to define the overall sprue channel 112-172-174, which provides a closed path from the ejector nozzle 68 to the mold cavities 110-170.

It is important in this regard to keep in mind that the thermoplastic material is injected under extremely high pressure. As such, the clamping force to be established along the parting line or interface 80 must be sufficient to resist this pressure, and prevent the thermoplastic material from being extruded along the interface 80, exteriorly of the mold cavities. Accordingly, an important part of any molding machine is the mechanism used to attain the initial clamping or preloading of the mold component preparatory to the injection operation.

Looking to FIG. 4, the clamping mechanism 154 for pre-loading of the mold components will now be considered. In this regard, the clamping mechanism 154 is positioned immediately behind the front plate 152 of the movable platen, and is comprised of a forward plate member 190 slidably mounted with respect to the tie-rods 74, a rearward plate member 192 also slidably mounted on the tie-rods 74, and a diaphragm arrangement, designated generally 196, interposed between the respective, slidably mounted plate members 190 and 192. As is illustrated in dotted outline in FIG. 4, the respective plate members 190 and 192 are interconnected pursuant to a number of resilient joints, each including a bolt 195 and compression spring 197, which joints 195-197 serve to interconnect the plate members while permitting slight relative movement therebetween. In this regard, it should be noted that the heads of the bolts 195 are disposed within recesses 199, and that the bolts are not drawn into a tight clamp relationship, enabling relative movement between the plate members 190 and 192.

Basically, the diaphragm arrangement 196 includes an elastomeric diaphragm member 198 which is clamped to a back plate 200 at its periphery by a clamping ring 202 and a series of bolts 204. The back plate 200 is carried on the rearward plate member 192, with the bolts 204 serving to interconnect said back plate to said rearward plate member. Disposed on the side of the diaphragm 198 opposite the back plate 200 is a pressure plate 206, which is carried by the relatively movable forward plate member 190, interconnection being effected by the bolts 208. The back plate 200 is apertured at 210 and has a nozzle or conduit 212 engaged with said aperture 210, which conduit 212 is in communication with the source of high pressure hydraulic fluid 18, discussed with regard to FIG. 1. Accordingly, as the elastomeric diaphragm 198 is clamped only about its outer peripheral edge, it serves to cooperate with the back plate 200 to define a diaphragm chamber 214 (best shown in FIG. 5), which chamber is adapted to be pressurized with the high pressure hydraulic fluid being supplied by the line 212. The operation of the clamping means 154 and the diaphragm arrangement 196 in the overall operation of the machine will be discussed in greater detail hereinafter, subsequent to the discussion to follow with regard to the construction of the latch means 156.

In the general operation of the mold handling system 62, the movable platen assembly 72 is traversed to the mold closed position of FIG. 5 by the rapid traverse means in the form of the air operated piston 81, and its associated piston arm 157. Once the respective platen assemblies 70 and 72 are in initial abutting contact, it is necessary to clamp the movable platen assembly 72 in position preparatory to pressurization of the clamping means diaphragm arrangement 196. For fixing the position of the movable platen assembly 72 there is provided a novel latch arrangement, designated generally 156, as best shown in FIG. 8. A detailed description of said latch arrangement 156 follows.

Looking initially to FIG. 4, it should be noted that the tie-rods 74, of which three are provided, include notched segments 220. It should also be noted from FIG. 5, that when the movable platen assembly 72 is in the mold closed position, that the rearward and forward plate members 190 and 192 have moved past the notched segments 220. Looking now to FIG. 8, the latch arrangement 156 is shown in detail. In this regard, said latch arrangements includes primarily a latch member 222 which is rotatably mounted with respect to the rearward plate member 192, said latch member being journaled upon the piston rod 157 by a bushing or bearing 223 (FIGS. 4 and 5). The latch member 222 includes a plurality of radially extending arms 224, 226 and 228, of an equal number corresponding to the number of tie-rods 74 employed. The respective latch arms 224, 226 and 228 are provided with hook shaped end segments 230, 232 and 234, respectively, which end segments are adapted to be engaged in the notched segments 220 of the tie-rod 74. An actuator mechanism 236 is provided, which mechanism is mounted to the rearward movable plate member 192 and is operatively coupled to the rotatably mounted latch member 222. In the illustrated form, the actuator mechanism 236 includes a double acting air piston 238 having an operating arm 240 connected directly to the arm 226 of the latch member 222. The air piston 238 being double acting, it is adapted to produce rotative movement of the latch member 222 between a latched position, as shown in full line, and an unlatched position, as illustrated in dotted outline. In the latched, full line position, the hook-shaped end segments 230, 232, and 234 are engaged in the notched segments 220 of the tie-rod 74, and the movable platen assembly 72 is precluded from movement rearwardly of the notches 220. As such, operation of the clamping means can now be effected to force the respective platen end faces 93 and 150 and the facing surfaces of the mold inserts into firm preloaded engagement.

With the above detailed description of the various components of the molding machine of the present invention in mind, a brief discussion of the machines operation will now be undertaken. In this regard, the function and detail structure of the heater-injector mechanism 64 are conventional and are not essential to the present invention, and as such have not been described in great detail. Basically, the overall heater-injector system is adapted to process thermoplastic resin material to a liquid state, and to deliver said resin material to the injector nozzle 68 under sufficient pressure to force the liquid resin into the mold cavity. Attention is now directed to the operation of the mold component handling system 62, for purposes of this discussion it will be assumed that the mold cycle has been completed, and that the platen assemblies 70 and 72 are in the mold open position of FIG. 4, with a molded part having been ejected via operation of the ejector mechanism 82. At this point, the machine control system will initiate the next cycle of operation, which cycle is controlled partially and initiated by the tape reader 54, with various other standard type of control devices, such as limit switches and air operated switches, being employed to attain the desired sequence of operation. As these control devices are conventional they have not been illustrated in detail, as their inclusion was deemed to be unnecessary and would serve only to obfuscate the drawings.

Accordingly, as a cycle of operation is commenced, the rapid traverse means provided by the double acting air cylinder 81 will move the platen assembly 72 forward along the tie-rods 74 into an initial abutting interfaced engagement with the stationary platen assembly 70. As the platen assembly 72 moves forward, the air cylinder 116 used to operate the ejector mechanism 83 is exhausted, and the engagement of the platen end face 150 with the return pin 142, along with the force of the spring means 126 and 128, will serve to retract the ejector mechanism. The movable platen assembly 72 will move forward until the respective end faces 93 and 150 abut, thereby defining the mold closed position.

At this point in the cycle, i.e. the initial mold closed position, the forward and rearward movable plate member 190 and 192 will have moved past the notched sections 220 on the tie-rods 74. The latch member 222 at this state in the cycle is in its unlatched position, as shown in dotted outline in FIG. 8, but will align with the notches 220. As the platen assembly 72 reaches the mold closed position, it will trip a limit switch or the like to actuate the operating mechanism 236, with the double acting air cylinder 238 rotating the latch member 222 in a counter-clockwise direction to engage the hook shaped ends 230, 232 and 234 in the notches 220. This engagement serves to fix the position of the rearward movable plate member 192 relative to the tie-rods 74.

Next, as an incident of the rotational movement of the latch member 222 to the latch position, said latch member 222 will engage a valve or limit switch means (not shown) which controls the supply of the high pressure hydraulic fluid from source 18 to the supply conduit 212. The operation of this switch will cause high pressure hydraulic fluid to enter the diaphragm chamber 214, which results in the diaphragm expanding against the expansion plate 206, FIG. 5. As a result of the high pressure expansion of the diaphragm 198, which is applied over the entire area of the expansion plate 206, the forward plate member 190 is urged to the left as is viewed in FIG. 5. This movement under high pressure, serves to urge the end faces 193 and 150 of the respective front plates 92 and 152, as well as a mating surface of the mold inserts 106-166 and 108-168 into firm preloaded clamped contact. The preloading or clamping force achieved is selected to be greater than the ejection pressure of the thermoplastic resin, so that no "flash" will result; that is extrusion of the plastic material along the interface or parting line 80.

Upon pressurization of the clamping means 154, the injection portion of the molding cycle will commence, which is controlled primarily by the information encoded upon the tape 56. As a result, the liquid thermoplastic material is introduced into the mold cavity via the nozzle 68 and the sprue channels 172, 174, 112. Thereafter, cooling water from the source 20 is introduced about the mold inserts in a conventional manner (the ports and channels for cooling water not having been shown), to rapidly cool and solidify the resinous material. After a predetermined cooling cycle, the supply line 212 leading to the high pressure diaphragm chamber 214 is exhausted to atmosphere, and the initial preloading forces, along with the action of the compression spring 197, serves to collapse the diaphragm, with the preloading established by the clamping means 154 being relieved. Once the clamping means 154 is de-energized, the control mechanism will automatically operate the latch mechanism 156, to rotate the latch member 222 clockwise from the full line position of FIG. 8 to the unlatched position as shown in dotted outline. This movement disengages the hook-like ends 230, 232, 234 from the notches 220, and frees the movable platen assembly 72 for movement relative to the tie-rod 74.

Additional control limit switch means (not shown) are provided on the plate member 192, such that the counter-clockwise movement of the latch member 222, will operate the double acting air cylinder 81 to traverse the movable platen assembly 72 rapidly to the right as viewed, thus achieving the mold open position of FIG. 4. Movement of the platen assembly 72 rearwardly, is employed in conjunction with additional control means (not shown) to operate the air supply to the air cylinder 116, whereby the piston arm 118 is extended to engage the ejector plate 114, and move said ejector plate to the right as viewed; that is from the inoperative position of FIG. 5, to that as illustrated in FIG. 4. This movement of the ejector plate 114, will cause the ejector pins 120 and 124, as well as any other ejector pins that may be integrally incorporated into the mold inserts 106 and 108 to extend forward of the mold cavity and the sprue channel, thereby ejecting the now solidified molded produce from the cavities 110. The molded articles (not shown), along with the runner segment corresponding to the sprue channels, will fall into a hopper located beneath the mold handling system 62, with the machine now being ready for the next cycle of operation. Accordingly, there has been disclosed a novel system for accomodating a plurality of molding machines, FIG. 1, as well as an improved molding machine design, FIGS. 4-8. The machine of FIGS. 4-8 utilizes a novel and improved mold clamping arrangement, as well as an improved latching mechanism. In this regard, the mold clamping arrangement eliminates the need for relative long tie-rods as required with prior art arrangements, and enables the attainment of preloading of the mold platens and mold inserts, with tie-rods of relatively short length. Further, the preloading forces are applied evenly, over a relatively larger area to assure a more uniform clamping action. While there has been illustrated and disclosed a preferred embodiment of the improved molding machine design and a system for utilizing molding machines without integrated self-contained power systems, it is envisioned that those skilled in the art may devise various alternations or modification of the specific embodiment shown, without departing from the spirit and scope of the invention as defined by the claims appended hereto.

What is claimed is:

1. An injection molding machine including means for injecting thermoplastic material into a mold cavity defined by at least two mold components, which components are capable of being placed in preloaded, clamped abutting relationship means for producing relative movement and preloading of said mold components, said means comprising a first stationary platen for accomodating one of a pair of mold components, and a second, relatively movable platen for accomodating the other of a pair of mold components, said second relatively movable platen comprising, a forward plate member and rearward plate member, means for fixing the position of the rearward plate member, resilient diaphragm means interposed intermediate said forward and said rearward plate member, said resilient diaphragm means providing a diaphragm chamber and means for pressurizing said diaphragm chamber with a fluid medium to expand said resilient diaphragm means, and to force said forward plate member away from said fixed rearward plate member and toward said stationary platen, such that the abutting mold components carried by said first and second platens will be brought into clamped, preloaded relation preparatory to the injection of thermoplastic material as a step in the molding process the resiliency of said diaphragm means serving to aid in the expelling of the fluid medium from said diaphragm chamber.

2. An injection molding machine according to claim 1, wherein said machine includes tie-rod means comprised of three equi-spaced tie-rod members upon which said second relatively moveable platen is mounted for movement.

3. A mold machine according to claim 1 wherein one of said platens includes a pair of cavities each for receiving a mold insert with the other platen having corresponding cavity means for mating mold inserts, said one platen including a partition between each said cavity, which partition defines an end wall surface facing the opposed platen members, said end wall surface having a sprue channel formed therein and leading to each said cavity and adapted to cooperate in a corresponding sprue channel formed therein and leading to each said cavity and adapted to cooperate in a corresponding sprue channel formed in said mold component, and thermo-sensing means permanently associated with said sprue channel to monitor the heat of the thermoplastic material to be injected into the mold cavity.

4. A machine according to claim 1 wherein said diaphragm means is interposed directly between said forward and rearward plate members, and is formed of an elastomeric material, said diaphragm being clamped to said rearward plate member to define therewith said diaphragm chamber, with the surface of said diaphragm opposite said chamber being in contact with said forward plate member, port means associated with said rearward plate member for introducing pressurized hydraulic fluid into said diaphragm chamber during preloading and clamping of the mold components.

5. An injection molding machine according to claim 1, further including spring means interposed between said forward and said rearward plate members, said spring means tending to collapse said diaphragm and expel hydraulic fluid therefrom when the diaphragm is no longer pressurized.

6. A machine according to claim 1, further including means for traversing said relatively movable platen between a first, mold open position and a second, mold closed position, and wherein said means for fixing the position of the rearward plate member of said second platen, comprises selectively operable latch means.

7. An injection molding machine according to claim 6, wherein said molding machine includes tie-rod means upon which said second platen member is mounted for relative movement, said latch comprising one or more notches formed in said tie-rod means at a predetermined location along the length thereof, a latch member rotatably carried by said rearward plate member, said latch member including arm means for engagement in said notch means, such that said second platen can be moved into position and said latch member rotated to engage said arm means in said notch means thereby fixing the position of said rearward plate member relative to said tie-rods and said forward plate member.

8. A molding machine according to claim 1 wherein said first and second platens can be brought into abutting relation, each said platen including cavity means formed therein, which cavity means are designed to receive and retain mating mold insert components.

9. A molding machine according to claim 8 wherein said stationary platen includes ejector means comprised of a movable ejector plate and ejector pins associated with said plate, and return pin means carried by said plate, and extending beyond the end face of said first platen, such that movement of the movable platen to the closed position will engage said return pin, causing same to be retracted relative to said platen end face, thereby producing movement of the ejector plate and ejector pin means to their mold closed position.

* * * * *